United States Patent [19]

Bruning et al.

[11] Patent Number: 4,628,284

[45] Date of Patent: Dec. 9, 1986

[54] HIGH FREQUENCY HIGH VOLTAGE POWER SUPPLY PREVENTING SIMULTANEOUS TRANSISTOR CONDUCTION

[75] Inventors: Gert W. Bruning, Tuckahoe, N.Y.; Mark W. Fellows, Buffalo Grove, Ill.

[73] Assignee: North American Philips Corporation, New York, N.Y.

[21] Appl. No.: 740,461

[22] Filed: Jun. 3, 1985

[51] Int. Cl.[4] ............................................. H03B 9/10
[52] U.S. Cl. .................................... 331/86; 331/186; 363/22
[58] Field of Search ................. 331/62, 86, 87, 113 A, 331/113 S, 117 R, 186; 363/22, 131, 133, 139; 219/10.55 B

[56] References Cited

U.S. PATENT DOCUMENTS 4,175,246 11/1979 Feinberg et al. .................. 331/86 X
4,356,431 10/1982 Feinberg ........................... 331/86 X Primary Examiner—Eugene R. LaRoche
Assistant Examiner—D. C. Mis
Attorney, Agent, or Firm—Robert T. Mayer; Bernard Franzblau

[57] ABSTRACT

A push-pull current-fed parallel resonant oscillator includes a parallel resonant LC tank circuit with one end coupled to one terminal of a DC current source via a serially connected first diode and first switching transistor and the other end of the tank circuit coupled to said one terminal via a serially connected second diode and second switching transistor. Respective capacitors (17, 21) shunt the series connections. The tank circuit inductor includes the primary of a transformer whose secondary is part of the transistor drive circuit. The circuit parameters are chosen to provide a duty cycle less than 50% and a high voltage gain of the AC tank voltage. The transistors are controlled to delay the turn-off time of the on-transistor thereby allowing a negative voltage to develop on the opposite capacitor which in turn delays turn-off of its parallel connected transistor so as to provide a dead-time ($\Delta t_2$) during the switching interval in which both transistors are simultaneously off. The oscillator voltage gain is dependent on the circuit parameters and the load.

13 Claims, 5 Drawing Figures

HIGH FREQUENCY HIGH VOLTAGE POWER SUPPLY PREVENTING SIMULTANEOUS TRANSISTOR CONDUCTION

BACKGROUND OF THE INVENTION

This invention relates to a high frequency high voltage power supply and, more particularly, to such a power supply that is especially adapted to supply Zener-type loads such as a magnetron for use in a microwave oven.

In order to develop a high frequency high voltage from a low frequency AC supply source, e.g. 115 volts, 60 Hz, it is known to use a current-fed parallel resonant oscillator using a pair of switching transistors operated in a push-pull mode. In this known circuit, a source of DC voltage (e.g. a positive terminal thereof) is coupled to a center tap on the primary winding of a transformer via a series choke coil. A capacitor is connected in parallel with the transformer primary winding to form therewith a parallel resonant LC tuned circuit. The load is coupled across the parallel resonant circuit. A pair of first and second switching transistors (e.g. of the NPN type) have their emitters coupled together to the negative terminal of the DC voltage source and their collectors connected to respective opposite ends (A and B) of the parallel resonant circuit. A secondary winding of the transformer is coupled to the base electrodes of the NPN switching transistors via a drive circuit thereby to alternately switch the transistors on and off to provide a push-pull mode of operation. The DC-AC converter or high frequency oscillator will self-oscillate at a frequency determined by the resonant frequency of the parallel LC tuned circuit.

This prior art circuit provides a simple method of converting DC energy to AC energy. Since the elements of the oscillator comprise transistor switching elements as well as reactive components and a simple drive circuit, conversion efficiencies of greater than 90% can be achieved. Resonant oscillators also reduce potential circuit losses since they minimize switching losses as well. Assuming the inductance of the choke coil is high enough so that the oscillator "sees" a good current source at its supply terminals, $Q > \pi$ to provide a good quality factor, and ideal switches and reactive components, a sinusoidal voltage waveform of high quality will be generated across terminals A, B of the tuned LC resonant circuit. If the transistors switch alternately at a 50% duty cycle, then the relationship between the RMS output voltage $V_{AB}$ and the DC input voltage $V_{cc}$ is given by the expression:

$$V_{AB} = V_{cc}\left(\frac{\pi}{\sqrt{2}}\right).$$

The DC inductor current $i_F$ in the choke coil $L_F$ will be $$i_F = \frac{V_{AB} \cdot I_R}{V_{cc}} = I_R\left(\frac{\pi}{\sqrt{2}}\right);$$

where $I_R$ is the RMS load current. The load impedance then is reflected to the DC input load impedance $R_L$ as:

$$R_L' = \frac{V_{cc}}{i_F} = \left(\frac{\sqrt{2}}{\pi}\right)^2 R_L.$$

As can be seen from the first expression, the output voltage ($V_{AB}$) is independent of the load and is proportional to the input voltage ($V_{cc}$), which means the gain is fixed. The switching elements must be designed so as to be capable of blocking at least the peak of the resonant circuit voltage $V_{AB}$ and must be able to carry the choke coil current, $i_F$, for one half of the cycle.

In the case of a conduction overlap of the pair of transistor switches during the switching interval, i.e. one transistor has not yet turned off when the other one is turned on, then the admittance is very large and, since it is in parallel with the resonant circuit capacitor (C), it essentially discharges this capacitor. Depending on the degree of conduction overlap, the parallel resonant tank circuit may be heavily loaded or even completely discharged, which in turn may destroy the transistor switching elements.

A second possible case is that of an off-time overlap of the transistor switches during the switching interval, i.e. both switches are off simultaneously. In this case, the admittance reaches a very small value and the current source will force a high voltage across the same to maintain a constant current. Once again, depending on the degree of the switching action, the off-voltage may exceed the voltage rating of the transistor switches and could even lead to a failure thereof.

It is therefore an object of this invention to provide a current-fed parallel resonant oscillator circuit which eliminates the critical overlap conditions of the prior art oscillator circuits and at the same time provides higher voltage gain.

Another object of the invention is to provide a current-fed parallel resonant oscillator circuit in which the voltage gain is dependent on the load.

Consumer microwave ovens conventionally employ a magnetron powered by a ferroresonant power supply operating at the power line frequency to supply microwave heating energy to the cooking cavity of the microwave oven. This power supply is relatively heavy and bulky. The power output of this power supply is discontinuously controlled by means of a control circuit which disconnects the 60 Hz AC supply voltage in order to vary the average microwave heating power applied to a load in the oven cavity. Typically, in a "defrost" or a "keep warm" cycle, the magnetron will be pulsed on for approximately 1 second and will be pulsed off for approximately 10 seconds. As a result of this type of operation, the magnetron heater filament cools down when the magnetron is off. This operation produces stresses on the magnetron which reduce its useful life. It would therefore be preferable to provide a means for varying the average microwave power applied to a cooking load in a smooth and continuous manner so as to keep the magnetron heater filament energized at all times during operation of the oven. It would be advantageous to keep the magnetron heater filament energized without the addition of a separate heater transformer, as in certain conventional magnetron power supplies.

SUMMARY OF THE INVENTION

It is therefore an object of the invention to provide a power supply for a microwave oven that incorporates a current-fed, parallel resonant oscillator in a modified class-D configuration that is lighter than conventional microwave oven power supplies, that is capable of continuous power control and that allows continuous heater power without the addition of a separate transformer.

In accordance with the invention, the push-pull current fed parallel resonant oscillator circuit described above has been modified by dividing the capacitor of the parallel resonant circuit into three separate capacitor components. First and second ones of these capacitors are connected in parallel with respective ones of said pair of NPN switching transistors. The third capacitor is connected in parallel with the transformer primary winding, as in the prior art circuit. It is important to note that the first and second capacitors do not function as snubber capacitors, as will become clear from the detailed discussion of the circuit and waveforms in the description of the preferred embodiments below. In accordance with the invention, the first and second capacitors are used as commutators for the switching transistors that fix the timing of the turn-on and turn-off of these transistors. In the new oscillator circuit, however, the resonant frequency of the oscillator circuit is determined by the transformer inductance in combination with the effective capacitance of the third capacitor as modified by the capacitance values of the first and second capacitors. Preferably, first and second diodes are connected in series with the first and second switching transistors, respectively, and with the same polarity. By a proper choice of circuit parameters, including the base drive circuit of the switching transistors, the power oscillator of the invention will provide a duty cycle of the transistor switching elements that is inherently limited to less than 50%, thereby preventing both transistor switches from being closed simultaneously during the commutation interval. Thus, an important feature is that the opening of a closed switch does not occur at a zero crossover point of the voltage (i.e. the natural commutation of the tank circuit), but at a later time due to a forced delay which allows a negative voltage to be developed on the opposite capacitor. This negative capacitor voltage reverse biases the diode in series with the transistor switch to be turned on. This delays the turn-on of said transistor switch even though the base drive voltage is then of a positive (turn-on) polarity. A short dead-time is created in which both transistor switches are cut-off (open switches).

If both transistor switches were to close simultaneously, then the admittance of the switches would be very large and since they are in parallel with the third capacitor (parallel capacitor of the resonant tank circuit) the third capacitor will be substantially discharged as a consequence. This can overload the tank circuit and may destroy the transistor switching elements.

It is therefore another object of the invention to provide a resonant type power oscillator which is not subject to a critical overlap condition of the transistor switching elements.

Another object of the invention is to provide a constant current fed parallel resonant push-pull power oscillator which avoids simultaneous closure of both transistor switches as well as generating a load dependent high voltage across the parallel resonant tank circuit.

The power oscillator circuit in accordance with the invention will generate a duty cycle less than 50% and a high transformer primary voltage and by proper phasing of the drive signals to the transistor switches will force the switches to turn on and off by means of a reverse voltage across the diode in series therewith. The on-time of the transistor switches will be inversely proportional to the load impedance and, as described above, will be maintained at less than 50% of the switching period. The load dependence of the transistor on-time in a Zener-type load (e.g. a magnetron or a gas discharge lamp) results in an inherent voltage regulation between the input and output voltages, i.e. automatic voltage regulation occurs in a Zener-type load when the input voltage $V_{cc}$ varies.

Another advantage is that the transformer turns ratio is minimized. Additional advantages of the novel circuit are that it is a self-oscillating system that takes advantage of zero-voltage switching, provides proper impedance matching of the load circuit to the input and has inherently high efficiency compared to square wave converters. In use as a power supply for a microwave oven magnetron, it weighs less than half of a conventional power supply and is capable of providing continuous power control. This in turn makes it possible to maintain continuous heater power to the magnetron, thereby extending its useful life.

The invention provides a self-sustaining power oscillator that uses feedback that is independent of the resonant tank voltage waveform. It provides a switch duty cycle of less than 50% in a push-pull circuit caused by a load regulated duty cycle and a forced delay of the switch opening. Small load currents will allow a high tank voltage and vice versa. There will be inherent voltage regulation in the case of a Zener type load despite a variation in the input voltage, $V_{cc}$. Another unusual feature is that there are absolutely no turn-on losses and the turn-off losses are minimized due to the relatively slow rise-time of the tank voltage.

The circuit is especially useful when low DC voltages are available and AC voltages are required which must be variable as a function of loading.

The new current-fed parallel resonant push-pull oscillator provides a variable high voltage gain depending on circuit parameters which can be predetermined for optimum performance. The splitting of the resonant circuit capacitor into three discrete capacitors in conjunction with a drive that provides a forced turn-off delay of the transistor switches produces the foregoing and other advantages over power oscillators currently known and available.

BRIEF DESCRIPTION OF THE DRAWING

The invention will now be described in greater detail by reference to the accompanying drawing in which.

DESCRIPTION OF THE PREFERRED EMBODIMENTS

Figure 1:
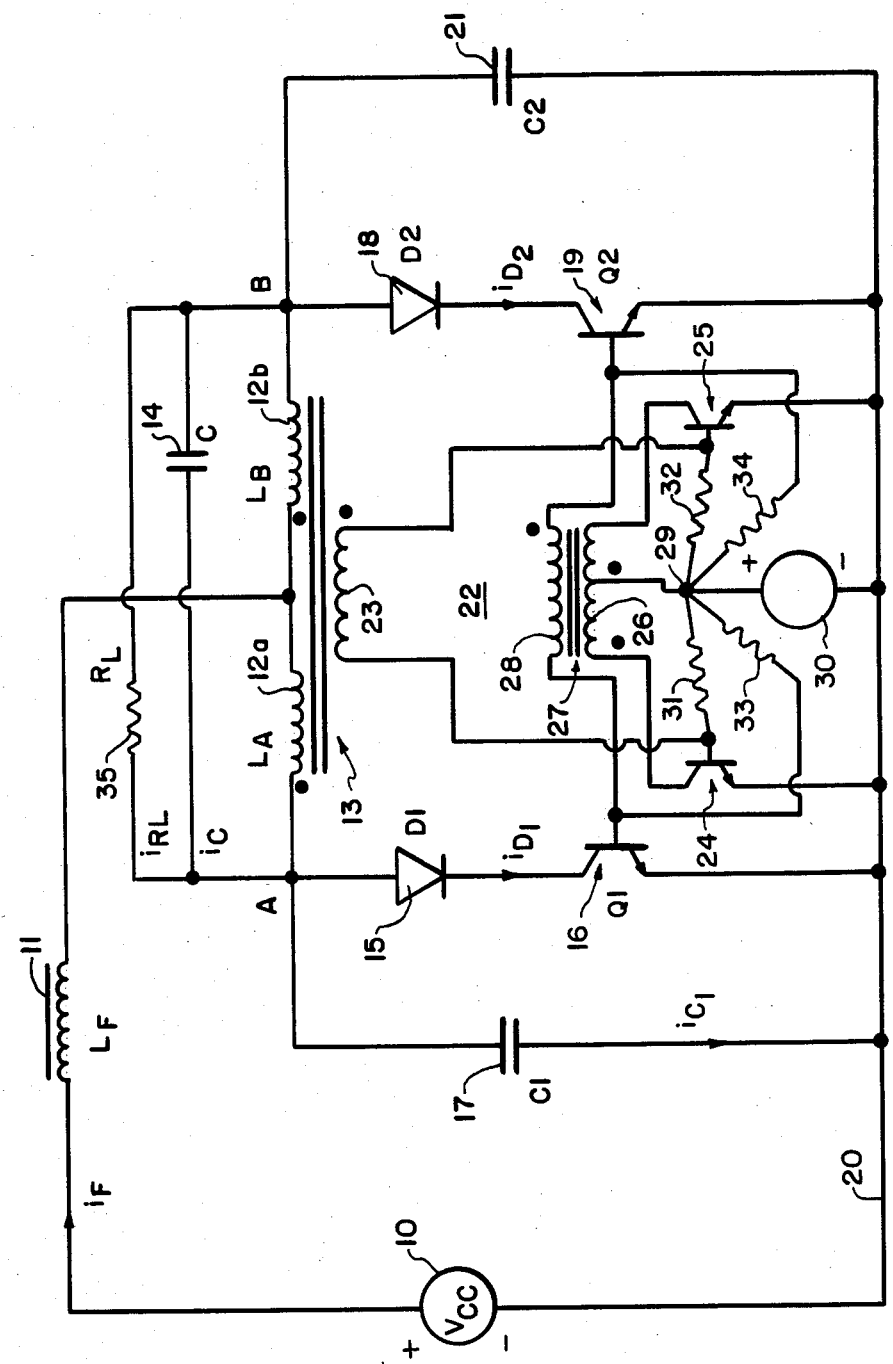
FIG. 1 is a schematic diagram of a first embodiment of the current-fed parallel resonant high voltage high frequency oscillator.

FIG. 1 illustrates the new current-fed parallel resonant high voltage power oscillator of the present invention. A source of DC voltage, $V_{cc}$, has its negative terminal connected to a common line 20 of the circuit that is usually connected to ground. The positive terminal of the DC voltage source 10 is connected via a series choke coil 11 having a self inductance $L_F$ to a center tap of the primary winding 12a, 12b of a transformer 13. The windings 12a and 12b have inductance values of $L_A$ and $L_B$, respectively. A capacitor 14 having a capacitance value C is connected in parallel with the primary winding to form therewith a parallel resonant tank circuit.

A diode 15 and an NPN transistor 16 ($Q_1$) are connected in series circuit with the same polarity between a junction point A on one side of the tank circuit and the common line 20. A capacitor 17 with a capacitance value of $C_1$ is connected in parallel with the series circuit consisting of diode 15 and transistor 16.

In a similar manner, a diode 18 and an NPN transistor 19 ($Q_2$) are connected in a second series circuit, also with the same polarity, between a junction point B on the other side of the tank circuit and the common line 20. A capacitor 21 having a capacitance value $C_2$ is connected in parallel with the second series circuit made up of diode 18 and transistor 19. The capacitance $C_1$ of capacitor 17 is equal to the capacitance $C_2$ of capacitor 21 to maintain circuit symmetry.

The transistors 16 and 19 will be alternately driven from cut-off into conduction and vice versa at a duty cycle of less than 50% by means of the transistor base drive circuit 22 in conjunction with the capacitors 17 and 21. The base drive circuit includes a secondary winding 23 of the transformer 13. The relative sense of the transformer windings is indicated by means of the conventional dot symbols on the respective windings 12a, 12b and 23. The terminals of secondary winding 23 are connected to respective base electrodes of NPN transistors 24 and 25. The emitters of transistors 24 and 25 are connected in common to the common line 20.

The collector of transistor 24 is connected to one side of a primary winding 26 of a second transformer 27 and the collector of transistor 25 is connected to the other end of the primary winding 26. Opposite ends of the second transformer's secondary winding 28 are connected to respective base electrodes of transistors 16 and 19. The sense of the windings is again indicated by the conventional dot symbols adjacent the windings.

A center tap on the winding 26 is connected to a circuit junction point 29. Junction point 29 is connected to the positive terminal of a source of DC bias voltage 30 of, for example, 10 volts. The negative terminal of the DC voltage source 30 is connected to the common line 20.

The circuit point 29 is connected via resistors 31 and 32 to the base electrodes of transistors 24 and 25, respectively, and is also connected via resistors 33 and 34 to the base electrodes of power switching transistors 16 and 19, respectively.

When the terminal A of the parallel resonant circuit goes high, transistor 25 is turned on via a signal derived from the base winding 23 of transformer 13. Assuming the DC bias voltage source 30 has a terminal voltage of 10 volts, then 10 volts are applied to the primary winding 26 of transformer 27. If the turns ratio of this transformer is 1:1, then 10 volts appears on the secondary winding 28 with the terminal thereof connected to the base of transistor 19 positive. Therefore, transistor 19 is forward biased but capacitor 21 then has a negative voltage so that it requires a short time (dead time) to again charge this capacitor to a positive voltage so that collector current can flow in transistor 19.

There is a slight delay before transistor 25 begins to conduct due to the voltage $V_{BE}$. The collector current of transistor 25 then ramps up linearly. There is a further significant turn-off delay due to the inherent charge storage time of transistor 25. The transistor current waveform approximates a sawtooth wave. The turn-off delays of the transistors 25 and 19 are a contributing factor in providing a switching dead time in which both transistors 16 and 19 are cut-off at the same time. This delay allows a negative charge on capacitor 17. The other half of the base drive circuit operates in a similar way. The resistors 31-34 are DC bias resistors that provide the proper base bias currents for the respective transistors 24 and 25. The 10 volt DC bias voltage source 30 is preferably turned on or off when the DC supply voltage 10 is turned on or off.

A load, for example, a resistor 35 having a resistance $R_L$ is connected across the parallel resonant tank circuit made up of elements 12a, 12b and 14.

The tank capacitor of the conventional push-pull oscillators has been divided into three separate capacitors, i.e. capacitors 14, 17 and 21, to provide a self-sustaining power oscillator with inherent power regulation in accordance with the present invention. This divided capacitor effectively directs a portion of the capacitive tank current into the circuit branches containing the switching transistors 16 and 19. A fully conductive switching transistor is equivalent to a closed switch and a cut-off transistor is the equivalent of an open switch.

The combination of DC voltage source $V_{cc}$ and series inductor 11 form a constant current source which is controlled by the load resistor 35 with the voltage $V_{cc}$ held constant. This constant current source delivers a current whose amplitude is a nonlinear function of the resistance ($R_L$) of load resistor 35.

After the oscillator is turned on it builds up to a steady state condition in which a sinusoidal voltage is developed across the terminals A, B of the tank circuit. This sinusoidal voltage has a frequency $$\omega = \frac{1}{2\pi \sqrt{L_p C_{eq}}}$$

where $L_P$=transformer primary inductance ($L_A$ and $L_B$) and $C_{eq}$=equivalent circuit capacitance composed of capacitors 14, 17 and 21 (C, $C_1$ and $C_2$), neglecting any circuit parasitic capacitances.

Assume the oscillator has achieved a steady state cycle. At the time $t_0$ in the waveform of FIG. 2A the base drive to the transistor switch 16 is removed. The transistor 16 ($Q_1$) is turned off with a time delay with reference to the zero crossing of the tank voltage $V_{AB}$. This forces a negative voltage ($V_{c2}$) to appear across capacitor 21. Transistor 16 ($Q_1$) rapidly turns off at the time $t_0$ and base drive is then applied to transistor 19 ($Q_2$). However, transistor 19 cannot immediately conduct collector current at time $t_0$ because the negative voltage $V_{c2}$ on capacitor 21 reverse biases the series diode 18.

Although the branch circuits 15–16 and 18–19 are now both essentially open circuits, the constant current source 10–11 forces a DC current to continue to flow after the time $t_0$. This DC current splits in half and charges capacitors 17 ($C_1$) and 21 ($C_2$) in a positive direction. In the time period from $t_0$ to $t_1$ (FIG. 2), the capacitor 21 is linearly charged until at time $t_1$ it is charged to a positive voltage equal to the sum of the diode forward voltage drop ($V_F$) and the transistor collector-emitter saturation voltage ($V_{ce\text{-}sat}$), i.e. $V_{c2} = V_F + V_{ce\text{-}sat}$. This delay time ($\Delta t_1$) from time 0 to $t_0$ has been deliberately introduced into the circuit in order to allow some capacitive tank current to charge capacitor 21 ($C_2$) negatively with respect to the common line 20 (e.g. circuit ground). The dead time introduced between time $t_0$ and $t_1$ prevents simultaneous conduction of switching transistors 16 and 19 so that the attendant disadvantages thereof are avoided.

Figure 2B:
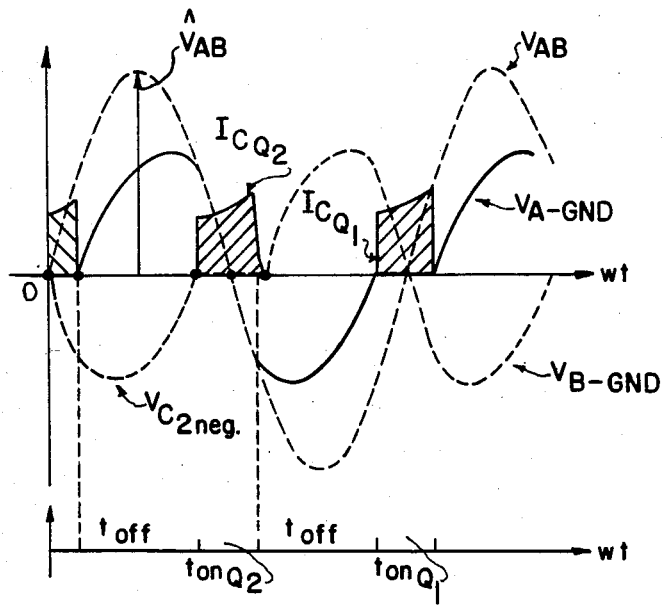
FIGS. 2A and 2B illustrate waveforms useful in explaining the operation of the invention.
Figure 2A:
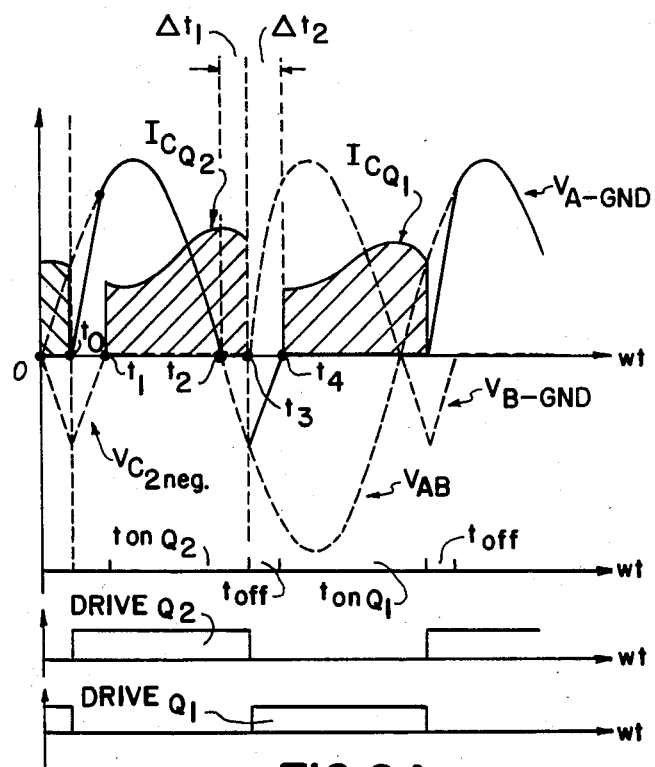

As soon as capacitor 21 reaches this relatively small positive voltage (i.e. at time $t_1$) transistor 19 begins to conduct collector current since it was already forward biased at its base electrode at time $t_0$. The collector current now flowing in transistor 19 ($Q_2$) is shown in FIG. 2A by the waveform labeled $I_{cq2}$. When transistor 19 turns on, capacitor 17 ($C_1$) is virtually in parallel with the capacitor 14 of the parallel resonant circuit. The switch 19 conducts the DC inductor current plus an AC component due to capacitor 17.

At time $t_2$ the voltage at terminal A to ground ($V_{A\text{-}gnd}$), also the tank voltage $V_{AB}$, again cross the zero axis. However, base drive is still applied to transistor 19 and so it continues to conduct collector current, as shown by waveform $I_{cq2}$ in FIG. 2A. By a judicious choice of circuit components, the delay time $\Delta t_1$ from time $t_2$ to $t_3$ allows capacitor 17 to charge negatively with respect to circuit ground.

After a predetermined charge has been delivered to capacitor 17 ($C_1$), transistor 19 is turned off at time $t_3$ as the base drive is then removed by means of base drive circuit 22. At the same time, the base drive circuit applies a positive base drive voltage to transistor 16 ($Q_1$). However, in a similar manner to that described above, collector current cannot flow through transistor 16 at time $t_3$ since the series diode 15 is reverse biased by the negative voltage, $V_{c1}$, appearing on capacitor 17. Both switches (16 and 19) are then effectively open.

The important feature is that the cut-off of transistor 19 does not occur at time $t_2$, the natural commutation time of the tank voltage, but rather at time $t_3$ due to a forced delay that allows a negative voltage to build up on capacitor 17 until the time $t_3$. At this point ($t_3$) transistor 19 is forced to turn off. The negative voltage on capacitor 17 reverse biases diode 15 and prevents current flow in transistor 16, even though base drive is then applied to it. A dead time is thereby created.

The constant current source again maintains a constant current. Since the series networks 12a, 17 ($L_A$, $C_1$) and 12b, 21 ($L_B$, $C_2$) each present the same impedance to this constant current, it divides in half and begins to charge capacitors 17 and 21. A common off-time is provided for both transistors 16 and 19 (time $t_3$ to $t_4$) until the constant current flowing in inductor 11 recharges capacitor 17 with a ramp voltage to the sum of the diode forward voltage drop and the saturation voltage of transistor 16 at time $t_4$. Collector current then begins to flow in transistor 16 (see waveform $I_{cq1}$) starting at time $t_4$ and the half cycle repeats for the opposite side of the circuit. During the time period $\Delta t_2$ from time $t_3$ to $t_4$, a magnetic field is not built up in the tank circuit inductance ($L_A$, $L_B$) because the DC currents therein are then equal and flow in opposite directions so as to cancel one another.

A voltage boost occurs across the tank circuit because the ramp voltage rise can be controlled by the proper choice of the values of capacitors 17 and 21, by the value of the DC current in inductor 11 and by the dead-time. In the prior art, a 50% duty cycle of the transistor switches results in a tank voltage of $\pi V_{cc}$. In the circuit described above, the tank voltage is boosted to a value greater than $\pi V_{cc}$ and approaches a very good sine wave.

The curves of FIG. 2A illustrate the operation of the power oscillator circuit in the case where the DC supply voltage $V_{cc} = V_{cc}(MAX)$ and where the load resistor 35 has a load resistance $R_L = R_L(MIN)$. On the other hand, FIG. 2B illustrates the circuit operation for the case where $V_{cc} < V_{cc}(MAX)$ and $R_L > R_L(MIN)$. It can now be seen that the currents which flow in the latter case are smaller than those which flow in the first case. The on-time of the transistor switches is shorter for the second case (FIG. 2B) than it was for the first case (FIG. 2A).

In a conventional push-pull oscillator circuit operating at a 50% duty cycle, the following relationships are valid:

$$\hat{V}_{AB} = \pi V_{cc} \text{ or } V_{AB} = 2.22 V_{cc}$$

Where $\hat{V}_{AB}$ is the maximum amplitude of the sinusoidal tank voltage, $V_{AB}$ is the RMS value and $V_{cc}$ is the DC supply voltage.

Also, the feed choke current, $i_F = 2.22 i_R$ where $i_R =$ load current in a resistor R.

$$V_{cc} i_F = \frac{V_{AB}^2}{R} = \frac{(2.22)^2 V_{cc}^2}{R} = i_R^2 R$$

$$i_{R2} = \frac{V_{cc} i_F}{R} = V_{cc} i_F \cdot \frac{i_F}{(2.22)^2 V_{cc}} = \frac{i_F^2}{(2.22)^2}$$

$$\text{so that } R = \frac{(2.22)^2 V_{cc}}{i_F} \text{ or } i_R = \frac{i_F}{2.22}$$

In accordance with the present invention where the duty cycle is less than 50%, i.e.

$$t_{on} < \tfrac{1}{2} T,$$

let the load current be:

$$i_R(<50\%) = i_R(50\%)$$

where T is the total period and $t_{on}$ is the on-time of a transistor switch.

then $V_{cc}(50\%) i_F(50\%) = V_{cc}(<50\%) \cdot i_F(<50\%)$ $$V_{cc}(<50\%) = V_{cc}(50\%) \frac{2 t_{on}}{T}$$

$$i_F(<50\%) = i_F(50\%) \frac{T}{2 t_{on}}$$

The power balance is then:

-continued $$V_{AB} \cdot i_R = V_{cc}(<50\%) \, i_F(50\%) \frac{T}{2t_{on}}$$

with:

$$i_R(50\%) = i_R(<50\%) = \frac{i_F(50\%)}{2.22}$$

$$V_{AB} = \frac{\pi}{\sqrt{2}} V_{cc}(<50\%) \frac{T}{2t_{on}} = 2.22 \, V_{cc} \frac{T}{2t_{on}}$$

A comparison of the tank voltage $V_{AB}$ in accordance with the invention $$\left( t_{on} < \frac{1}{2} T \right)$$

with the prior art $V_{AB}$ for a 50% duty cycle illustrates a voltage gain for the invention equal to the value $T/2t_{on}$.

It can also be shown that the transistor on-time will be determined by the circuit parameters, e.g. the load, $R_L$, the capacitance $C_1 = C_2$ of capacitors 17 and 21 and the delay time $\Delta t_1$.

Figure 3:
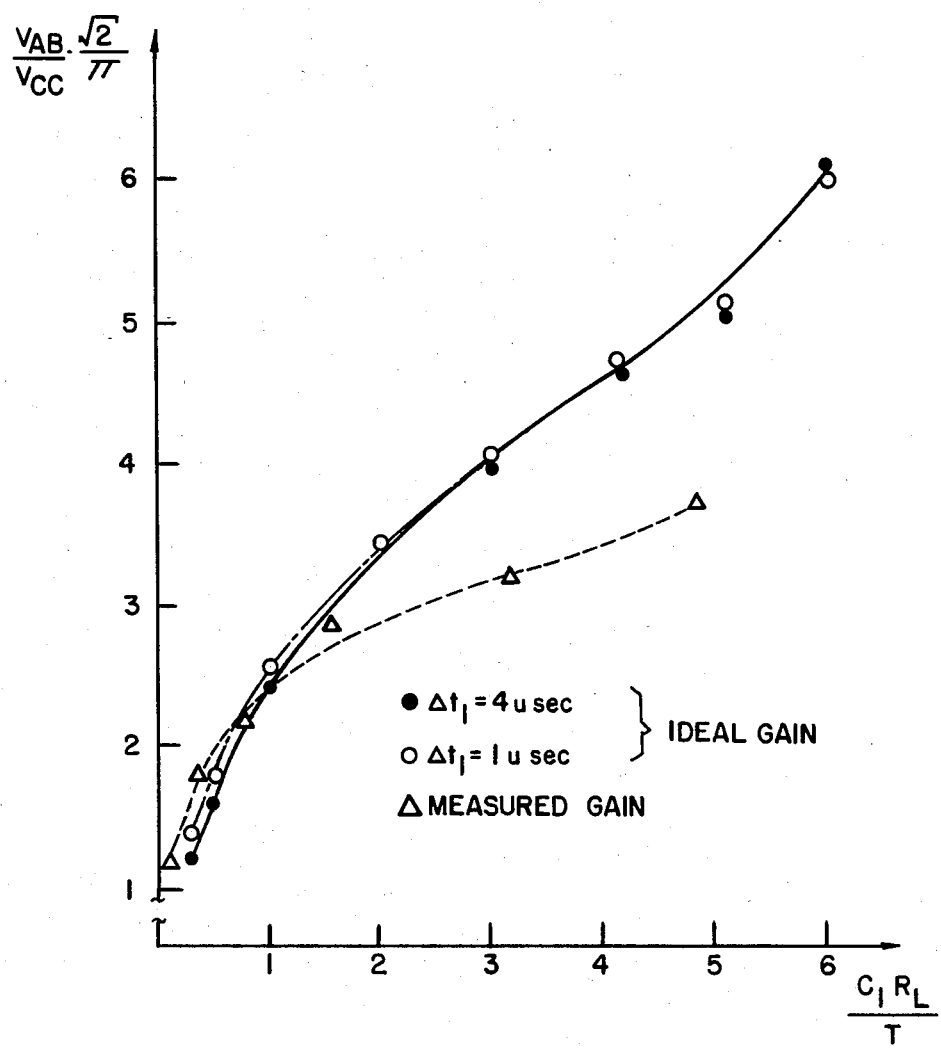
FIG. 3 illustrates the dependence of the voltage gain of the circuit on the choice of time constant.

In FIG. 3 the circuit voltage gain $V_{AB}/V_{cc}$ is shown as a function of the normalized time constant $C_1R_L$ (normalized to the switching period T), where $C_1$ is the capacitance of capacitor 17 (equal to the capacitance $C_2$ of capacitor 21) and $R_L$ is the value of load resistance of resistor 35. The value of $\Delta t_1$ has been chosen as a parameter and typical bipolar transistor storage times between one microsecond and four microseconds were used to obtain the results shown in FIG. 3.

The curves of FIG. 3 show that a variation in storage time is only significant for small $C_1R_L$ combinations which reflect operation close to a quality factor of $Q = \pi$. The useful region is spanned by $0.4 < C_1R_L/T < 1.5$ which represents a circuit Q variation of $\pi < Q < 4\pi$. When Q exceeds a value of $4\pi$, circuit losses, winding resistance, the equivalent series resistance of the tank capacitors, etc. all combine to limit the circuit Q so that a lower gain is obtained in comparison to an ideal circuit, i.e. a circuit without diode or transistor losses, winding resistance, etc. This gain limiting effect occurs at about $$\frac{C_1 R_L}{T} = 1.5.$$

The push-pull power oscillator described will operate as a constant power source for a fixed $V_{cc}$ but variable resistive load. Inherent voltage regulation will occur if a Zener-type load is present and the input voltage $V_{cc}$ varies. A voltage boost operation can be achieved by means of the circuit described. A self-sustaining power oscillator is derived using feedback that is independent of the tank voltage waveform along with a simple drive circuit. A switch duty cycle of less than 50% is achieved in a push-pull circuit produced by a load regulated duty cycle and a forced delay of the switch opening.

A power oscillator circuit has been constructed using the following circuit values:
inductor 11 ($L_F$) ... 600 μHy
winding 12a=12b($L_A=L_B$) ... 60 μHy
capacitor 14(C) ... 0.204 μF
capacitors 17, 21 ($C_1=C_2$) ... 0.068 μF This circuit had a value of $\Delta t_1 = 3$ μsec, $V_{cc} = 25$ V, delivered 1200 W to a load resistor 35 ($R_L$) wherein 51 ohm $\leq R_L \leq 500$ ohm.

Figure 4:
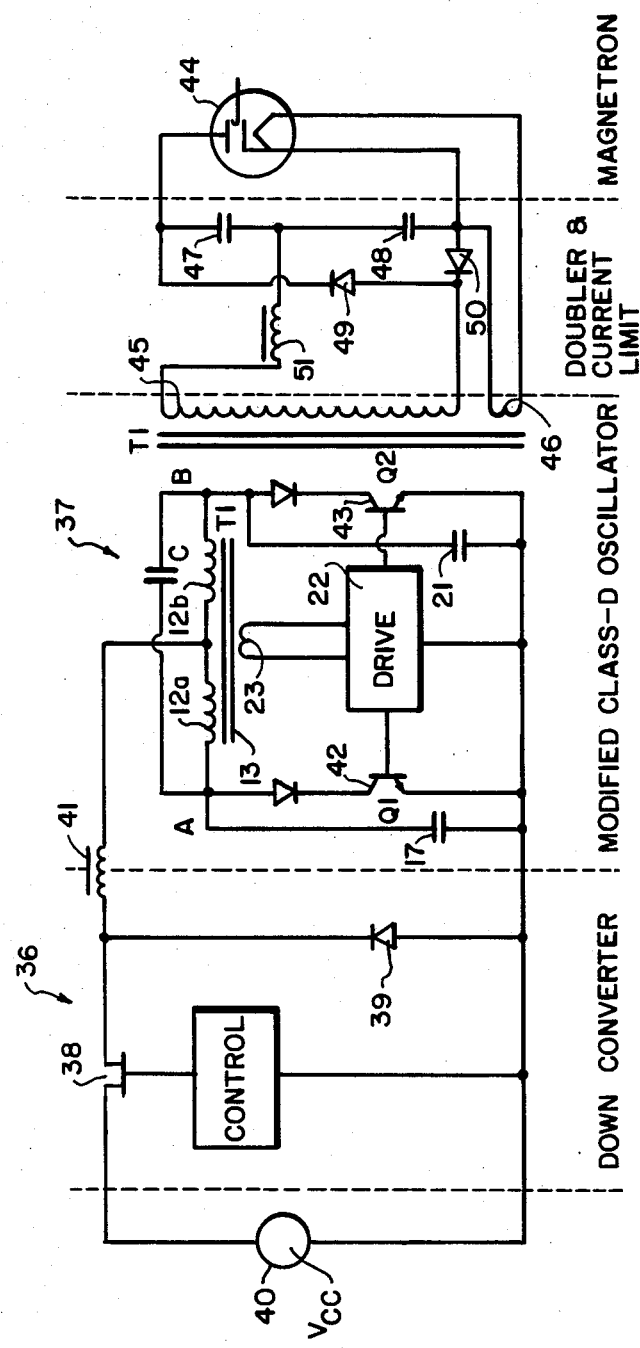
FIG. 4 is a schematic diagram of the invention as a part of a solid state power supply for a microwave oven magnetron.

FIG. 4 is a schematic diagram illustrating the invention as applied to a Zener-type load, more particularly for use in a solid state power supply for a microwave oven magnetron. This power supply incorporates the current-fed, parallel-resonant oscillator in a modified class-D configuration described above in connection with FIG. 1.

A down converter 36 is coupled to the input side of the modified class-D power oscillator 37. The down converter operates as a voltage controlled or pulse width modulated current source. It includes a field effect transistor (FET) 38 connected in a series circuit with a diode 39 across the output terminals of the voltage source 40. A series inductor 41 couples the junction point of FET 38 and diode 39 to the center tap of the primary winding 12a, 12b of the transformer 13 of the power oscillator. The down converter and the power oscillator share the inductor 41. The power oscillator is similar to the power oscillator of FIG. 1. However, the output of the power oscillator is coupled to the magnetron 44 via an output winding 45 of the transformer 13, whereas in FIG. 1 the load $R_L$ was coupled across the parallel resonant tank circuit.

A filament winding 46 of transformer 13 provides heater current to the magnetron filament. The output winding 45 is coupled to a voltage doubler circuit consisting of series connected capacitors 47 and 48 and diodes 49 and 50 via an inductor 51 connected between one terminal of the winding 45 and the junction point between capacitors 47 and 48. The anode of the magnetron is connected to the common terminals of capacitor 47 and diode 49 and the cathode is connected to the common terminals of capacitor 48 and diode 50. The common junction point between diodes 49 and 50 is connected to the other terminal of output winding 45.

The waveform diagrams of FIGS. 2A and 2B differ in the load ($R_L$) and $V_{cc}$ conditions which essentially neglect the behavior of the magnetron as a load on the circuit. The magnetron is a Zener diode type of load with a threshold voltage of about 3.5 KV. Above the threshold voltage it represents a very small load impedance and therefore forces the amplitude of the tank voltage, $V_{AB}$, to remain relatively constant since the switch on-time, $t_{on}$, in the power oscillator is inversely proportional to the load impedance. Therefore, the conduction angle ($t_3 - t_1$ in FIG. 2A) increases.

The power oscillator 37 generates a high tank voltage, $V_{AB}$, even for small values of the source voltage $V_{cc}$ due to the fact that by design the magnetron voltage is held just below its threshold voltage, hence a large load impedance and a small on-time ($t_{on}$) for the switches (FIG. 2B). However, the magnetron heater receives nearly full heater power which provides significant advantages over conventional magnetron power supplies in which the heater is energized only when the magnetron is in operation, i.e. when it is energized above its threshold voltage.

This circuit thus provides a preheat current for the magnetron filament which reduces the stresses produced thereon in the prior art devices. This mode of operation significantly extends the useful life of the magnetron and also reduces or avoids the switching transients prevalent in microwave oven power supplies which switch both the magnetron anode and heater voltage on and off in unison. The circuit of FIG. 4 will provide approximately 70% heater power when the magnetron is switched off and 100% heater power when the magnetron is switched in operation, and irrespective of the RF power level.

The transformer 13 provides isolation for the magnetron. The voltage doubler circuit and inductor 51 form a DC feedvoltage and peak current limiter as well as an impedance matching circuit between the magnetron load and the power oscillator. The amount of power delivered to the magnetron is controlled by controlling the on-time of transistor 38. The magnetron power is thus dependent on the control pulse width of transistor 38.

The microwave oven power supply of FIG. 4 is capable of providing continuous power control and will weigh less than half of a conventional magnetron power supply of the same power rating. It will have a voltage gain $$\frac{\hat{V}_{AB}}{V_{cc}} = \pi \cdot \frac{T}{2t_{on}} \cdot D$$

where $\hat{V}_{AB}$=zero-to-peak transformer primary voltage, $V_{cc}$=DC input voltage, T=switching period, $t_{on}$=on-time of a switching transistor and D=duty cycle of transistor 38.

The switching transistor on-time is inversely proportional to the load resistance and is automatically maintained at less than 50% of the switching period (T). The load dependence of the on-time in a Zener-type load (e.g. a magnetron) results in an inherent voltage regulation between the input voltage and the output voltage. A further advantage of the invention is that the transformer turns ratio is minimized. The power oscillator circuit is a self-oscillating system that takes advantages of zero-voltage switching, provides good impedance matching of the load circuit to the input and exhibit an inherently high efficiency. The foregoing and other advantages and features of the invention are achieved, inter alia, by dividing the resonant capacitor into three discrete capacitor components in conjunction with a drive featuring a forced turn-off delay or advance for the switching transistors of the power oscillator.

Although the invention has been shown and described with reference to preferred embodiments thereof, it will be obvious that various changes and modifications may be made therein without departing from the spirit and scope of the invention as defined by the appended claims.

What is claimed is:

1. A solid state power oscillator comprising:
   a pair of input terminals for connection to a current source,
   a parallel resonant tank circuit comprising a primary winding of a transformer connected in parallel with a first capacitor,
   first and second diodes,
   first and second switching transistors,
   means connecting the first diode and the first transistor in a first series circuit between a first end terminal of the tank circuit and a first of said input terminals,
   means connecting the second diode and the second transistor in a second series circuit between a second end terminal of the tank circuit and said first input terminal,
   a second capacitor coupled in parallel with the first series circuit,
   a third capacitor coupled in parallel with the second series circuit,
   means connecting a tap on the primary winding to a second of said input terminals, and
   a drive circuit including a secondary winding of said transformer and coupled to control electrodes of the first and second transistors for supplying drive signals thereto so as to alternately switch the transistors on and off in push-pull operation and with a forced switching delay such as to provide a dead-time wherein both transistors are simultaneously off during the switching interval of the transistors.

2. A power oscillator as claimed in claim 1 wherein said drive circuit simultaneously provides a turn-off signal and a turn-on signal to the control electrodes of said first and second switching transistors and vice-versa during said switching interval.

3. A power oscillator as claimed in claim 2 wherein the circuit components are chosen so as to produce a sinusoidal voltage across the tank circuit and a forward drive signal is applied to the cut-off one of said transistors by said drive circuit at a time that the capacitor in parallel with the cut-off transistor is charged to a voltage of a polarity that reverse biases the diode in series with said cut-off transistor thereby to provide said forced switching delay.

4. A power oscillator as claimed in claim 1 wherein the capacitance values of the second and third capacitors are approximately equal.

5. A power oscillator as claimed in claim 1 wherein said current source comprises a source of relatively constant DC voltage and an inductor in series therewith, and
   means for coupling a load to said power oscillator such that the load determines the amplitude of the tank circuit voltage.

6. A power oscillator as claimed in claim 1 wherein the second and third capacitors have approximately equal values of capacitance and the input terminals are coupled to a source of DC voltage whereby the tank circuit voltage varies as a function of the DC voltage.

7. A magnetron power supply comprising:
   a power oscillator as claimed in claim 1,
   a voltage controlled current source coupled to said pair of input terminals of the power oscillator,
   and wherein the transformer further comprises an output winding for coupling to the anode and cathode of a magnetron and a heater winding for coupling to the magnetron filament.

8. A power supply as claimed in claim 7 wherein said current source comprises:
   a second pair of input terminals for connection to a source of DC voltage,
   a control transistor and an inductor connected in series between one input terminal for the DC voltage source and the second input terminal of the power oscillator,
   means connecting the other input terminal for the DC voltage source to the first input terminal of the power oscillator, and
   a control apparatus coupled to a control electrode of said control transistor.

9. A push-pull current-fed parallel resonant oscillator circuit comprising:

a parallel resonant tank circuit comprising an inductor connected in parallel with a first capacitor, means connecting a center tap on said inductor to one terminal of a source of direct current, a first diode and a first switching transistor connected in a first series circuit between a first end terminal of the tank circuit and a second terminal of the source of direct current, a second diode and a second switching transistor connected in a second series circuit between a second end terminal of the tank circuit and said second terminal of the direct current source, a second capacitor coupled in parallel with the first series circuit, a third capacitor coupled in parallel with the second series circuit, and control means coupled to said tank circuit and to said switching transistors for controlling the duty cycle of the switching transistors thereby to control the tank circuit voltage, said control means including a drive circuit for supplying drive signals to control electrodes of the first and second switching transistors to make the transistors alternately conductive, said drive circuit, said diodes and transistors and said second and third capacitors together being operative to delay the turn-off point of a conductive one of said transistors beyond the zero crossing of the tank voltage thereby to provide a current path by which the opposite one of the parallel capacitors is charged to a negative voltage thereby to delay the turn-on of a non-conductive one of said transistors so as to provide a dead-time in which both transistors are simultaneously cut-off.

10. An oscillator as claimed in claim 9 wherein the circuit parameters are selected so that $$0.05 < \frac{t_{on}}{T} < 0.5,$$

where $t_{on}$ is the on-time of a switching transistor and T is the total switching period of the transistors.

11. An oscillator as claimed in claim 9 wherein the second and third capacitors have approximately equal capacitance values and the circuit parameters are selected so that the transistor on-time is independent of the tank voltage and is mainly determined by one or more of the following parameters, the oscillator load impedance, the capacitance value of the second or third capacitor and the transistor turn-off delay time $\Delta t_1$.

12. An oscillator as claimed in claim 9 wherein the second and third capacitors have approximately equal capacitance values and the circuit parameters are selected so that the tank voltage is dependent on the load and the duty cycle is limited to a value less than 50%.

13. An oscillator as claimed in claim 9 wherein said inductor is a primary winding of a transformer and said drive circuit comprises a secondary winding of said transformer.

* * * * *